United States Patent [19]

Reible, Jr. et al.

[11] 4,016,479
[45] Apr. 5, 1977

[54] HIGH FREQUENCY POWER CONVERTER DRIVE CIRCUIT

[75] Inventors: George A. Reible, Jr., Saugerties; George D. Sevigny, Red Hook, both of N.Y.

[73] Assignee: International Business Machines Corporation, Armonk, N.Y.

[22] Filed: Mar. 28, 1975

[21] Appl. No.: 563,239

[52] U.S. Cl. .............................. 321/45 R
[51] Int. Cl.² ........................... H02M 7/537
[58] Field of Search ............... 321/45 R; 331/113 A

[56] References Cited

UNITED STATES PATENTS

| | | | |
|---|---|---|---|
| 3,219,906 | 11/1965 | Keller et al. | 331/113 A X |
| 3,319,180 | 5/1967 | Mesenhimer | 331/113 A X |
| 3,441,831 | 4/1969 | Goto et al. | 321/45 R |
| 3,566,149 | 2/1971 | Paradissis | 321/45 R |
| 3,832,623 | 8/1974 | Boyden et al. | 321/45 R |

*Primary Examiner*—William M. Shoop
*Attorney, Agent, or Firm*—Frederick D. Poag

[57] ABSTRACT

A push pull inverter has a pair of chopper transistors connected to opposite ends of a center tapped primary of an output transformer and off drive clamps for turning the chopper transistors off alternately under the control of an oscillator. On drive is provided entirely by feedback derived from a secondary winding on the transformer and coupled to the base circuits of the chopping transistors. When the oscillator causes one transistor to be clamped off, the resulting reversal of polarities in the transformer delivers on-drive to the other transistor base. Since the off-switching of the first transistor causes the on-switching of the second transistor in a sequential manner, the two can never be on at the same time, despite the effects of minority carrier storage in the switching transistors.

9 Claims, 2 Drawing Figures

HIGH FREQUENCY POWER CONVERTER DRIVE CIRCUIT

FIELD OF THE INVENTION

This invention relates to push-pull switching circuits and more particularly to an improved switching transistor control in a high frequency push-pull power inverter or amplifier.

DESCRIPTION OF THE PRIOR ART

Push-pull power inverter or amplifiers are well known in the art, and it is also well known that, in circuit configurations of this kind, a short circuit can occur if the two switching devices are on, or conductive, at the same time. A typical push-pull circuit of this kind may employ a transformer having a center tapped primary winding, conduction in the opposite halves of which is under the control of respective switching transistors connected in series therewith. So long as only one of the transistors is on, the flow of current through the winding half to which the transistor is connected presents a load to the transistor. However, if both the transistors are on at any instant, current flows in opposite directions in the two halves of the primary winding and the resulting fluxed cancel each other whereby the transistors are presented with reduced or zero loads. At best, this may result in distortion in the output of the circuit, or it may cause one or both of the transistors to fail.

In some types of push-pull circuits this is not a problem because of other characteristics of the circuit. For example, in one type of circuit the core is of a saturating type and the base drive for the two transistors is obtained by feedback windings on the core. Off-drive for the transistor which is on is obtained by saturation of the core, at which time dv/dt generated in the associated feedback winding falls to zero and, following minority carrier depletion, that transistor turns off abruptly. This causes the flux in the transformer to decay and switch and this transition provides on-drive for the other transistor. Since this sequence cannot occur until the first transistor switch is off, and since the switching off is an abrupt action after carrier depletion, there is no substantial simultaneous conduction of the two transistors.

In another type of prior art push-pull circuit, a non-saturating core is utilized and the on and off drive signals for the bases of the two switching transistors are provided from an oscillator source. An advantage of this type of circuit is that it switches at the frequency of the oscillator rather than in a free-running mode and, therefore, the frequency of operation is not altered by load or other parameters. In such a circuit, if on drive were coupled to the base of one transistor at the same instant that offdrive was initiated at the base of the other transistor, both transistors would be on for the duration of the minority carrier depletion time of the first transistor. One way that this problem has been overcome in the prior art is to provide an off-clamp diode coupled to each switching transistor base and powered by respective feedback windings on the push-pull transformer. Thus, the non-conducting transistor would be held off until the transformer switched and the off clamp action ended so as to permit the on-drive from the oscillator or other driving signal source to be communicated to that transistor. In circuits of this kind, although the problem of overlap is obviated, it is the task of the signals source to provide all of the on and off drive and to do so through a series impedance which permit the off-clamp to be effective.

SUMMARY OF THE INVENTION

The present invention overcomes the problem of control of switching transistors in a push-pull circuit by utilizing a combination of externally initiated off-drive and feedback on-drive in a push-pull power amplifier or inverter. According to one aspect of the invention, a push-pull inverter circuit is provided having a pair of chopper transistors connected in series with respective portions of primary winding means of a push-pull transformer. Chopper transistors are turned off alternately by off-drive clamps under the control of an oscillator, but the on-drive is provided entirely by feed-back derived from secondary winding means on the transformer and coupled appropriately to the base circuits of the chopping transistors. When the oscillator causes one transistor to be clamped off, the resulting reversal polarities in the transformer delivers on-drive to the other transistor base. Since the off-switching of the first transistor causes the on-switching of the second transistor in a sequential manner, the two can never be on at the same time.

Accordingly, a primary object of the present invention is to provide a push-pull power amplifier or inverter having improved control means for the conduction control devices thereof.

Another object of the invention is to provide a push-pull circuit as aforesaid utilizing feedback for on-drive of the conduction devices but external signal control for off-drive of same.

Another object of the invention is to provide, in a transformer coupled push-pull transistor switching circuit, feedback means from the transformer for providing on-drive to the switching transistors thereof and coupling means for providing off-clamp signals to the switching transistors from an external source such as a timing signal oscillator.

Still another object of the invention is to provide in circuits as aforesaid, constant frequency push-pull operation which is of full or nearly full class B duty cycle without danger of overlap whereby a short circuit operating condition can occur.

Yet another object of the invention is to provide, in an inverter or oscillator as aforesaid, non-saturating transformer operation, whereby the frequency of operation is readily variable.

Still another object of the invention is to provide a circuit as aforesaid which is responsive to an external synchronizing signal of low power.

The foregoing and other objects, features and advantages of the present invention will be apparent from the following description of a preferred embodiment of the invention as illustrated in the accompanying drawing.

DETAILED DESCRIPTION OF THE DRAWING

Figure 1:
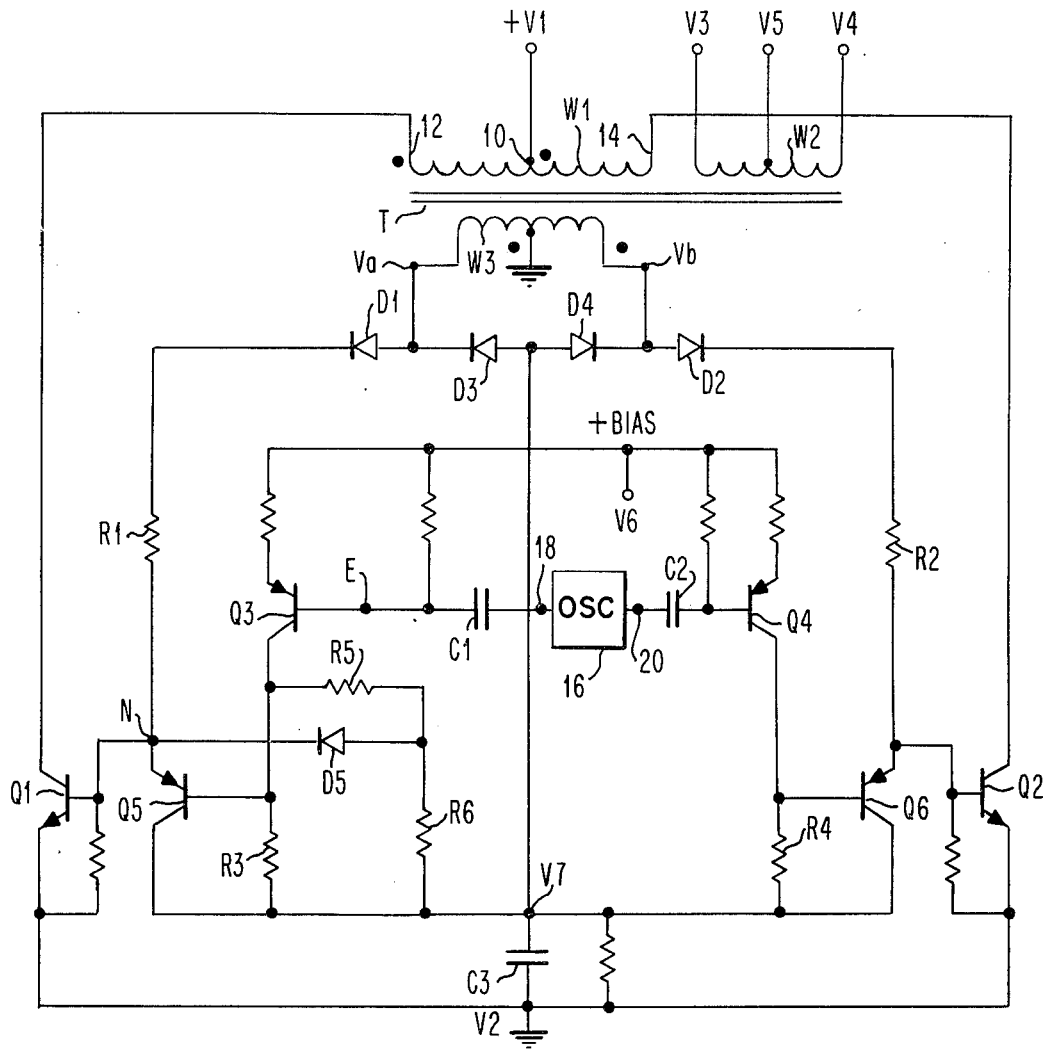
FIG. 1 is a schematic circuit diagram of a transistor switching push-pull power inverter embodying the invention.

FIG. 1 illustrates a push-pull inverter suitable for converting a DC voltage V1–V2 to an AC output V3–V4, which may have a center tap output V5.

This conversion is effected by operation of transformer T which has a primary winding W1 having a center tap 10 to which DC input terminal V1 is connected and opposite end terminals 12, 14 which are connected to the collector-emitter circuits of switching transistors Q1, Q2 and thence to the other side of the input DC supply, V2. Transformer T also has one or more power output secondary windings, one of which is shown at W2. Winding W2 has its opposite ends connected to the aforesaid AC output terminals V3 and V4, respectively, and its center tap connected to output V5. These outputs can be used directly as an AC signal source. However, in the present case, the switching action of transistors Q1 and Q2 cause transformer T to operate in a square wave fashion whereby the output V3–V4 is a square wave especially suitable to rectification and filtering to provide an ultimate DC output. Since the winding ratio of windings W1, W2 may be chosen arbitrarily, the V3–V4 output may be of a higher or lower voltage amplitude than that of V1–V2, and since transformer T provides DC isolation, it can be ungrounded, or its center tap or either end can be grounded to provide a desired relationship to ground.

For operation of Q1, Q2 in a cyclic manner, another secondary winding, W3, is provided as a feedback winding and an oscillator 16 is provided which provides an input timing signal, both in a manner to be described hereinbelow.

It is a feature of the invention that, in running condition, the feedback signal from winding W3 provides only on-drive to the bases of the respective transistors Q1, Q2, and that the reciprocally corresponding off-drives are provided through circuits under the control of oscillator 16. This operation will be described by tracing the signal conditions in those portions of the circuit which are concerned with running operation. Let it be assumed that Q1 is on and Q2 is off. Current will flow from V1 to terminal 10 of primary winding W1 and thence from terminal 12 thereof through the collector emitter circuit of Q1 to V2. This flow of current between terminal 10 and 12 of W1 induces a positive potential at terminls VA of feedback winding W3 which is communicated through diode D1 and resistor R1 to node N and thence to the base of transistor Q1 to provide continuing on-drive to this transistor. At the same time the voltage, which is nearly V1, impressed across portion 10–12 of winding W1, is reflected in winding W2 to provide the useful output V3–V4. The parameters of the circuit are so chosen that the core of transformer T does not saturate during the half cycle of circuit operation as Q1 continues to conduct.

This half cycle is terminated by a signal from oscillator 16 which produces a square wave AC output at its output terminals 18, 20. In the illustrated embodiment of the invention, oscillator 16 may be a 20K Hz multivibrator. Alternatively, any other suitable source of input signal may be applied at terminals 18, 20. This signal is communicated via coupling capacitors C1, C2 to the bases of predriver transistors Q3, Q4. Transistors Q3 and Q4 operate between a bias potential V6–V7 provided in a manner to be described hereinafter. In addition to emitter resistors, the circuits of Q3 and Q4 have collector load resistors R3 and R4 and have their collectors connected in driving relation to the bases of driver transistors Q5 and Q6, connected in emitter follower fashion to provide off-drive to transistors Q1 and Q2.

In this case, since Q1 is conducting, the condition of oscillator 16 is such that its terminal 18 is relatively negative as terminal 20 is relatively positive. Accordingly, Q3 is conducting and because of the divider action of its emitter resistor and R3, the base of Q5 is more positive than the emitter of Q5 and Q5 is off. Accordingly, the potential of node N is controlled by Va through R1, and Q1 receives continued base drive.

Initiation of the second half of a running condition cycle of operation occurs when oscillator 16 switches and its output terminal 18 becomes relatively positive. This communicates a control pulse to the base of Q3, turning Q3 off and allowing R3 to provide on-drive to the base of Q5, turning Q5 on. This causes node N to fall, thereby providing off-drive to the base of Q1. Q1, having been conducting in saturation, does not turn off immediately and the first half cycle of operation of transformer T and its windings continues until minority carrier storage in Q1 is depleted. At this time, Q1 turns off abruptly and terminates current through portion 10, 12 of winding W1, causing transformer T to begin switching. This switching action causes the potential at terminal Va to fall and that at Vb to rise. At the same time the relatively negative signal at terminal 20 of oscillator 16 has been communicated through C2 to turn on Q4, thereby turning off Q6, which had been acting as an off-clamp for Q2. Accordingly, as soon as Vb becomes positive, it communicates a signal through D2 and R2 to the base of Q2, turning Q2 on. Termination of the second half cycle of operation and reinitiation of the first cycle is initiated when oscillator 16 again switches, turning Q4 and Q6 off so as to provide off-clamp for Q2 through R4 and initiating a switching of transformer T to its first condition, after depletion of minority carriers in Q2.

Recapitulating this operation, in the illustrated inverter of this invention, a feedback winding W3 is driven by the primary winding W1 of the output transformer to provide Va and Vb which provide base drive for chopper transistors Q1 and Q2 through diodes D1 and D2, thereby turning Q1 and Q2 on alternately in push-pull fashion. However, they are turned off by Q5 and Q6 under the control of multivibrator 16, thereby forcing fixed frequency operation of the output transformer T. This frequency of operation is that of signal source multivibrator 16, for example, 20 KHz. Since, in running condition, there is no base drive for Q2 from Vb and D2 until Q1 has turned off and the polarity of winding W3 (as driven by W1) reverses and Vb rises, Q2 can never be on while Q1 continues to conduct, and vice versa. Q1 is shut off after the oscillator (multivibrator 16), AC coupled to the base of Q3, turns Q3 off, allowing the base of Q5 to fall via the R3 connection toward minus bias V7. This turn-on of Q5 clamps node N to minus bias and turns off Q1. In like manner, Q2 is shut off after Q4 is turned off, turning Q6 on and clamping the base of Q6 to V7.

Figure 2:
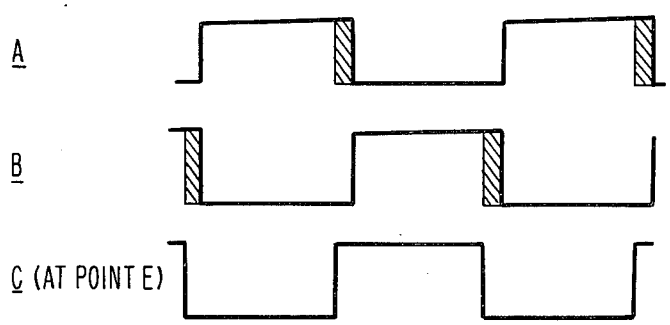
FIG. 2 is a waveform diagram schematically indicative of the operation of the circuit of FIG. 1.

This operation is illustrated schematically in FIG. 2. Curve A shows the conduction Q1, curve B shows that of Q2 and curve C shows the operation of signal source 16. The shaded portions of curves A and B are indicative of the conduction Q1 and Q2 during minority storage time therein, after source 16 has switched. It is this storage supported conduction which, in the absence of the aforedescribed features of the present invention, could result in a short circuit or overcurrent condition in Q1 and Q2. Thus, if Q2 were driven on by source 16 during the time Q1 was still conducting, or vice versa, a winding W1 would have the collector currents of Q1 and Q2 flowing out of terminals 12 and 14, respectively, at the same time, and W1 would not present the required impedance to transistors Q1 and Q2, whereby the collector-emitter currents in Q1 and Q2 could become excessive. In any case, such a condition would result in undesired distortion in the output V3–V4.

The foregoing concerns steady state operation of the illustrated circuit. Any suitable means may be provided to initiate conduction of either Q5 or Q6 for start-up operation. Although not per se a part of the present invention, a suitable start-up circuit is illustrated. This start-up circuit includes R5, R6 and D5. Initially, capacitor C3 has no charge. At start-up, the oscillator 16 turns Q3 on, which provides base drive for Q1 via a bias supply V6–V2, the emitter resistor of Q3, R5 and D5 to node N. Q5 is held off because its base is more positive than node N. Positive potential at the juncture of R5 and R6 which forward biases diode D5 provides a current supply to node N and thus to the base of Q1, turning Q1 on.

Conduction through Q1 draws current from supply V1 through primary winding W1 and induces a plus voltage at Va in winding W3 which is coupled through D1 to node N to provide continued base drive for Q1. When oscillator 16 turns Q3 off, Q5 is turned on, thereby clamping node N to the negative bias bus and providing off-drive to Q1. The turnoff of Q1 causes Va to fall and Vb to rise, turning on Q2 via D2. When oscillator 16 operates to turn Q4 off, Q6 turns on thereby turning Q2 off, and so on.

D3 and D4 comprise a full wave rectifier which gradually charges capacitor C3, bringing bias V7 to below ground. The R5 – R6 divider allows D5 to forward bias only until C3 charges and this minus bias develops. With the minus bias present at V7, the anode of D5 never rises above node N, thereby preventing Q1 from turning on prematurely. When Va is negative, N is negative but Q3 is off and there is no current feed through R1. Normal running condition has then been achieved.

The illustrated circuit has particular utility as a power inverter output stage of a DC - AC - DC regulator power supply. In such case, the input V1 – V2 is the regulated DC previously obtained by rectification and filtering of a source AC and regulation of the resulting DC by some means, such as pulse width modulated transistor switching regulator. The resulting regulated and filtered DC is then supplied to V1. Regulators of this kind also may provide the bias source V6. In a power supply of such a kind, the output V3–V4 can be a load output which, because of its square wave characteristic, is easily rectified and filtered to provide an ultimate DC output. Other windings (not shown) can provide other load outputs as well as a source for circuit bias voltages, all as is well known in the art.

Alternatively, the illustrated circuit can be utilized as a power amplifier for simply producing an increased power output corresponding to the frequency of oscillator 16. In any case, the fact that oscillator 16, in running condition, is called upon to provide only gating for off-drive (not power for off-drive), and since the running condition ondrive for switching transistors Q1 and Q2 is entirely regenerative, low power circuits can be used in oscillator or multivibrator 16. This enables the control circuitry to be embodied in low power, low cost compact technologies.

Thus, while the invention has been particularly shown and described with reference to a preferred embodiment thereof, it will be understood by those skilled in the art that various changes in form and detail can be made without departing from the spirit and scope of this invention.

What is claimed is:
1. In a push-pull switching circuit,
   a pair of conduction control means each having a controlled conduction circuit and a control input terminal,
   a source of input power,
   push-pull inductive means connecting said conduction control means across said source for alternative operation of said inductive means in opposite senses as one and the other of said conduction means conduct in alternation,
   feedback means coupled to said inductive means to bias the first of said conduction means into conduction when the second of said conduction means turns off and to continue such bias during the continuance of conduction of said first conduction means, and vice versa,
   said feedback means including means connected to block operation thereof from communicating turn-off signals to either of said control terminals,
   alternating input signal means,
   said coupling means adapted to communicate turn-off signals from said input signal means to said control terminals in alternation, whereby said circuit operates in push-pull oscillation at the frequency determined by said input signal means and under the power of said source.
2. A circuit in accordance with claim 1, wherein
   said inductive means comprises a transformer having primary winding means, comprising two halves,
   and wherein each of said half and a respective one of said conduction control means is connected in series across said source.
3. A circuit in accordance with claim 2, wherein
   said primary winding means is a center tapped winding having its center tap connected to one side of said source,
   and said conduction control means are transistors connected to the other side of said source,
   said transistors being operated by said feedback means and said turn-off signals between high and low impedance states.
4. A circuit in accordance with claim 3, wherein
   said transistors are operated between essentially saturated and cut-off states.
5. A circuit in accordance with claim 3, wherein said alternating input means comprises a lower power oscillator.
6. A circuit in accordance with claim 5, wherein said oscillator is a square wave multivibrator means.
7. A circuit in accordance with claim 2, wherein
   said feedback means comprises secondary winding means on said transformer,
   and the said blocking means in said feedback means comprises a pair of unidirectionally conducting means interposed respectively between said secondary winding means and said control terminal of a respective one of said conduction control means.
8. A circuit according to claim 2, further including a bias source and a network connecting said source to said control inputs, and wherein said coupling means for said alternating input signal means comprises alternatively operative means connected to said network and operative individually to clamp said control input terminals to their conduction control means turn-off level.

9. A circuit according to claim 3, further including a bias source and a network connecting said source to said control inputs,
and wherein said coupling means for said alternating input signal means comprises a pair of means connected to said network and operative in opposite phase to clamp said control input terminals to their conduction control means turn-off level.

* * * * *

UNITED STATES PATENT OFFICE
CERTIFICATE OF CORRECTION

PATENT NO. : 4,016,479

DATED : April 5, 1977

INVENTOR(S) : George A. Reible, Jr. and George D. Sevigny

It is certified that error appears in the above-identified patent and that said Letters Patent are hereby corrected as shown below:

Column 6, line 28, "said" should read ---and---

Column 6, line 61, delete the word "said" before "blocking means"

Signed and Sealed this

Twenty-second Day of August 1978

[SEAL]

Attest:

RUTH C. MASON
Attesting Officer

DONALD W. BANNER
Commissioner of Patents and Trademarks